US012561517B2

(12) United States Patent
Goodsitt et al.

(10) Patent No.: US 12,561,517 B2
(45) **Date of Patent: *Feb. 24, 2026**

(54) AUTOMATIC FILLING OF A FORM WITH FORMATTED TEXT

(71) Applicant: Capital One Services, LLC, McLean, VA (US)

(72) Inventors: Jeremy Goodsitt, Champaign, IL (US); Austin Walters, Savoy, IL (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/190,527

(22) Filed: Mar. 27, 2023

(65) Prior Publication Data

US 2023/0229855 A1 Jul. 20, 2023

Related U.S. Application Data

(63) Continuation of application No. 17/444,780, filed on Aug. 10, 2021, now Pat. No. 11,615,235.

(51) Int. Cl.
*G06F 40/174* (2020.01)
*G06F 40/103* (2020.01)
*G06F 40/221* (2020.01)

(52) U.S. Cl.
CPC .......... *G06F 40/174* (2020.01); *G06F 40/103* (2020.01); *G06F 40/221* (2020.01)

(58) Field of Classification Search
None
See application file for complete search history.

(56) References Cited

U.S. PATENT DOCUMENTS

| | | | |
|---|---|---|---|
| 6,345,278 B1 | 2/2002 | Hitchcock et al. | |
| 7,069,256 B1 | 6/2006 | Campos | |
| 7,660,779 B2 | 2/2010 | Goodman et al. | |
| 9,842,097 B2 | 12/2017 | Selig | |
| 10,133,718 B2 | 11/2018 | Iasi et al. | |
| 10,176,159 B2 | 1/2019 | Vohra et al. | |
| 10,614,099 B2 | 4/2020 | Eigner et al. | |
| 10,643,026 B2 | 5/2020 | Wooldridge et al. | |
| 11,615,235 B2 | 3/2023 | Goodsitt et al. | |
| 2002/0156846 A1* | 10/2002 | Rawat | G06Q 30/04 715/744 |
| 2005/0200907 A1* | 9/2005 | Kitayama | G06F 40/131 358/444 |
| 2010/0179963 A1 | 7/2010 | Conner et al. | |
| 2015/0070373 A1* | 3/2015 | Clinton | G06V 30/245 345/589 |

(Continued)

*Primary Examiner* — Mustafa A Amin
(74) *Attorney, Agent, or Firm* — Harrity & Harrity, LLP

(57) ABSTRACT

In some implementations, a device may identify a form field, of a form, that is to be filled with text. The device may determine a formatting for the text that is to be used for filling the form field. The formatting for the text may be determined based on content that is indicative of the formatting that is to be used for filling the form field, or information relating to at least one previous filling of the form field that is associated with a successful submission of the form. The device may modify the text in accordance with the formatting that is determined to obtain formatted text. The device may cause filling of the form field with the formatted text.

21 Claims, 9 Drawing Sheets

400 ➔

410 ⌇ Identify a form field, of a form, that is to be filled with text

420 ⌇ Determine a formatting for the text that is to be used for filling the form field 430 ⌇ Modify the text in accordance with the formatting that is determined to obtain formatted text 440 ⌇ Cause filling of the form field with the formatted text

(56) References Cited

U.S. PATENT DOCUMENTS

| | | | |
|---|---|---|---|
| 2017/0052942 A1* | 2/2017 | Bastide | G06F 40/18 |
| 2019/0155892 A1* | 5/2019 | Dakin | G06F 40/274 |
| 2020/0151443 A1 | 5/2020 | Florencio et al. | |
| 2024/0020458 A1* | 1/2024 | Láinez Rodrigo | G06F 40/216 |

* cited by examiner

100

| Form | Field | Formatting | Result |
|------|-------|-----------|--------|
| example.com/registration | Last Name | Aaaaa, Aa. | Rejected |
| example.com/registration | Phone | (####) ####-#### | Accepted |
| example.com/registration | Phone | ###-#### | Rejected |
| ... | ... | ... | ... |

Data Structure

115
Obtain information relating to at least one previous filling of the form field(s)

Device

100

Text for filling out form field(s)

User ID: 10
First Name: John
Last Name: Doe
Phone Number: 7778889999
Date of Birth: January 1, 2000

120

Determine the text that is to be
used to fill out the form field(s)

Device

Registration Form – example.com/registration

First Name

Last Name

Do not include punctuation

Phone

Date of Birth

Ex: YYYYMMDD

Submit

400

410 — Identify a form field, of a form, that is to be filled with text

420 — Determine a formatting for the text that is to be used for filling the form field 430 — Modify the text in accordance with the formatting that is determined to obtain formatted text 440 — Cause filling of the form field with the formatted text

AUTOMATIC FILLING OF A FORM WITH FORMATTED TEXT

RELATED APPLICATION

This application is a continuation of U.S. patent application Ser. No. 17/444,780, filed Aug. 10, 2021 (now U.S. Pat. No. 11,615,235), which is incorporated herein by reference in its entirety.

BACKGROUND

Electronic forms, such as web forms, are commonly used to facilitate the receipt of information from users. In many instances, the information requested in such forms is repeated across various documents. An autofill tool may enable the rapid entry or filling of form fields by storing user data and inserting the stored user data into appropriate form fields. The autofill tool may insert stored data into a form based on predefined form field identifiers associated with the data. For example, the autofill tool may scan the fields of an electronic form for a form field identifier, and automatically insert user data associated with the form field identifier into the appropriate form field.

SUMMARY

In some implementations, a system for automatic filling of a form of a web page includes one or more memories, and one or more processors, communicatively coupled to the one or more memories, configured to: identify a form field, of the form, that is to be filled with text; determine a formatting for the text that is to be used for filling the form field, wherein the formatting for the text is determined based on: content of the web page that is indicative of the formatting that is to be used for filling the form field, and information relating to at least one previous filling of the form field that is associated with a successful submission of the form, wherein the information indicates at least one previous formatting used for the at least one previous filling of the form field; modify the text in accordance with the formatting that is determined to obtain formatted text; and cause filling of the form field with the formatted text.

In some implementations, a method of automatic filling of a form of a web page includes identifying, by a device, a form field, of the form, that is to be filled with text; processing, by the device, the web page to identify content of the web page that is indicative of a formatting for the text that is to be used for filling the form field; determining, by the device, the formatting for the text based on the content that is indicative of the formatting; modifying, by the device, the text in accordance with the formatting that is determined to obtain formatted text; and causing, by the device, filling of the form field with the formatted text.

In some implementations, a non-transitory computer-readable medium storing a set of instructions for automatic filling of a form of a web page includes one or more instructions that, when executed by one or more processors of a device, cause the device to: identify a form field, of the form, that is to be filled with text; obtain information relating to at least one previous filling of the form field that is associated with a successful submission of the form, wherein the information indicates at least one previous formatting used for the at least one previous filling of the form field; determine a formatting for the text that is to be used for filling the form field based on the information; modify the text in accordance with the formatting that is determined to obtain formatted text; and cause filling of the form field with the formatted text.

DETAILED DESCRIPTION

The following detailed description of example implementations refers to the accompanying drawings. The same reference numbers in different drawings may identify the same or similar elements.

As described above, an autofill tool may enable the rapid entry or filling of form fields by storing user data and inserting the stored user data into appropriate form fields. In some scenarios, the autofill tool may misidentify a form field and enter the incorrect user data into the form field. For example, the autofill tool may enter a user's last name into a form field intended for entry of a company name. In other scenarios, the autofill tool may enter the correct user data into the form field using an incorrect formatting. For example, the autofill tool may enter a user's phone number using parentheses around an area code when the form field calls for a consecutive string of numbers.

Use of the incorrect user data and/or the incorrect formatting may result in an error that prevents successful submission of the form. As a result, a user may need to manually enter or update information into the form, as well as resubmit the form one or more times until the submission is successful. Accordingly, use of the incorrect user data and/or the incorrect formatting may consume excessive processing resources and/or network resources associated with multiple form submissions.

A solution to the above technical problems is described herein for automatic filling of a form field of an electronic form with the appropriate text in the appropriate format. The electronic form may be a form of an electronic document, such as a web page. In some implementations, a device may determine a formatting for text that is to be used for filling the form field based on a content of the electronic document that is indicative of the formatting that is to be used and/or information relating to at least one previous filling of the form field that is associated with a successful submission of the form. The device may modify text that is to be filled into the form field based on the formatting that is determined, and automatically fill the form field with the modified text. In this way, errors preventing successful form submission may be reduced, thereby conserving processing resources and/or network resources that may otherwise be used for multiple form submissions.

FIGS. 1A-1F are diagrams of an example 100 relating to automatic filling of a form with formatted text. As shown in FIGS. 1A-1F, example 100 includes a device, which may be associated with a user (e.g., a user device). This device is described in more detail in connection with FIGS. 2 and 3. The device may use an application to perform one or more of the operations described below. For example, the device may use a web browser plugin or extension to perform one or more of the operations described below.

Figure 1A:
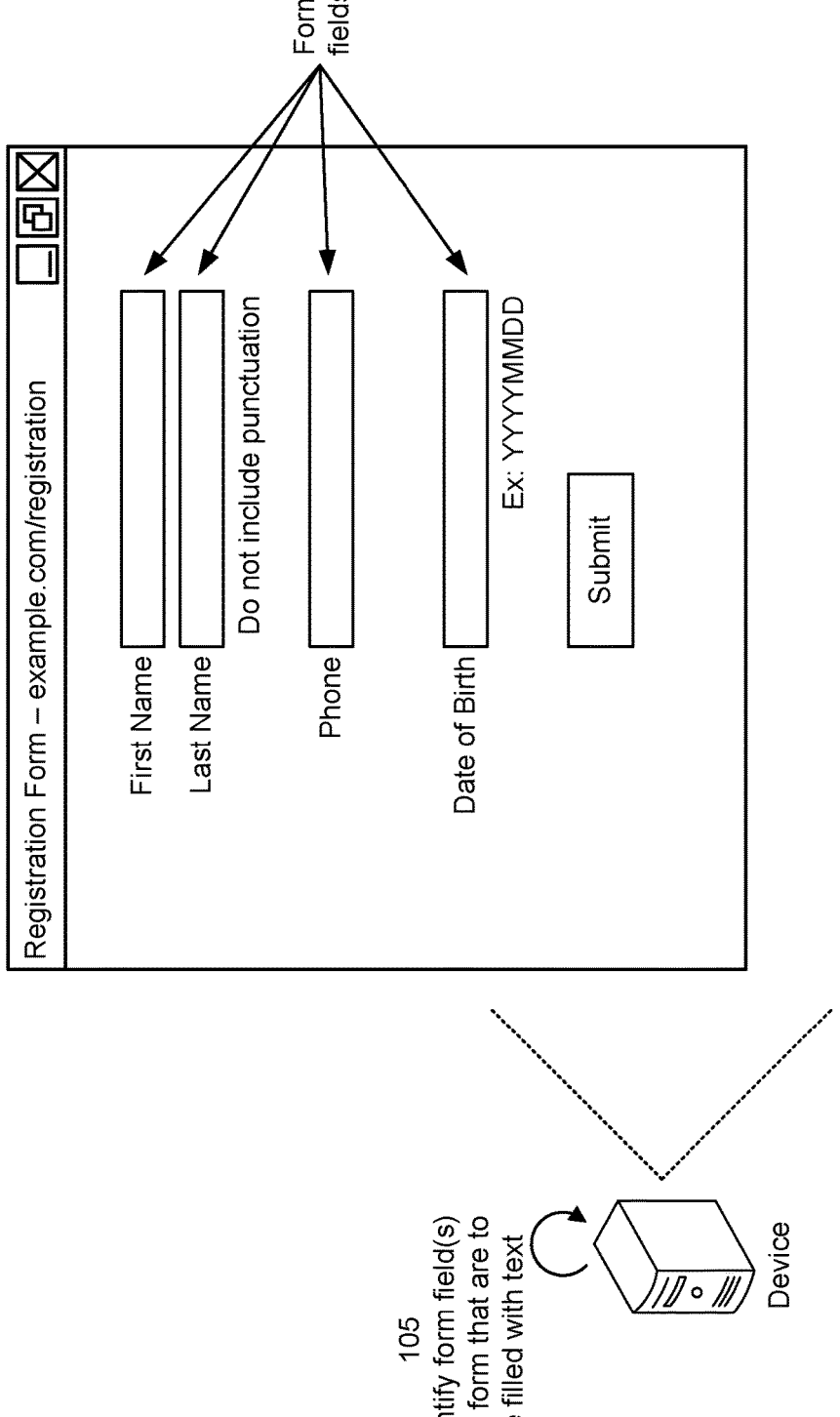
FIGS. 1A-1F are diagrams of an example implementation relating to automatic filling of a form with formatted text.

As shown in FIG. 1A, and by reference number 105, the device may identify one or more form fields of a form that are to be filled with text. The form may be an electronic form associated with an electronic document. The electronic document may be any machine-readable and machine-storable document, such as a web page. The device may process (e.g., parse) the electronic document (e.g., a document object model (DOM) for the electronic document) to identify the form fields. For example, the form fields may be associated with text input elements of a form element of the electronic document. The form fields may include a field for entering a first name, a field for entering a last name, a field for entering a company name, a field for entering an email address, a field for a phone number, a field for entering a physical address, and/or a field for entering a website address, among other examples.

Figure 1B:
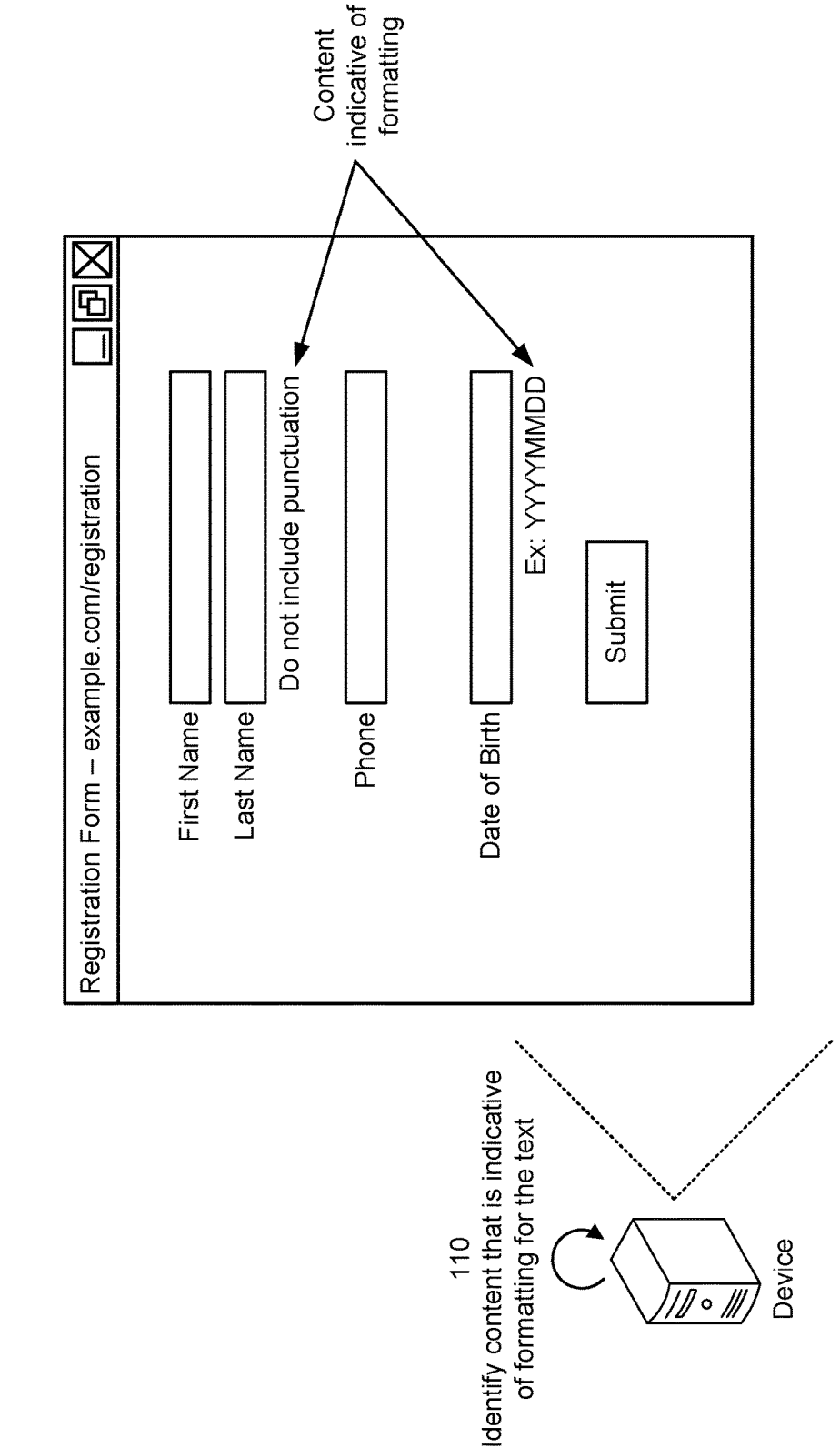

As shown in FIG. 1B, and by reference number 110, the device may identify content of the electronic document that is indicative of the formatting to be used for text that is filled into one or more of the form fields. In some implementations, content indicative of the formatting may be applicable to all fields of the form. Additionally, or alternatively, content indicative of the formatting may be applicable to only a single field of the form. Content indicative of the formatting may be text located above, below, adjacent, or within the form. For example, content indicative of the formatting may be text located above, below, adjacent, or within a form field. In some implementations, content indicative of the formatting may be default text filled in a form field and/or instructional text in a container (e.g., an element) of the electronic document that is grouped with, or adjacent to, a container (e.g., an element) for the form field. Content indicative of the formatting for a form field may indicate an example entry for the form field and/or may indicate one or more rules for filling the form field.

To identify the content indicative of the formatting, the device may process (e.g., scan) the electronic document. For example, the device may parse code (e.g., hypertext markup language (HTML) code, cascading style sheet (CSS) code, a DOM, or the like) for the electronic document to identify the content indicative of the formatting. In some implementations, the device may identify content of the electronic document as being indicative of the formatting for a form field based on a location of the content. For example, the content may be indicative of the formatting for the form field if the content is contained within the form field (e.g., default text of the form field) and/or if the content is contained in a container that is grouped with, or adjacent to, a container for the form field. In some implementations, the device may identify content of the electronic document as being indicative of the formatting for a form field based on one or more attributes of a container for the content (e.g., a name of the container, an identifier of the container, a formatting style used for the container, and/or a type of the container). For example, the content may be indicative of the formatting for a form field if an attribute for the container includes a particular word or text string, such as "example," "label," "instruction," or the like.

In some implementations, the device may identify content of the electronic document as being indicative of the formatting for a form field based on the text of the content. For example, the content may be indicative of the formatting for a form field if the text includes a particular word or text string, such as "example," "ex," "alphanumeric," "punctuation," or the like. As another example, the device may compare the text to one or more formatting samples for form fields (e.g., formatting samples for a date form field may include "YYYYMMDD," "Month Day, Year," or the like). The device may identify the content as being indicative of the formatting if the text corresponds to one of the formatting samples. Moreover, the device may determine the formatting indicated by the content based on the formatting indicated by the corresponding formatting sample. In some implementations, the device may identify content of the electronic document as being indicative of the formatting for a form field based on natural language processing of the text of the electronic document and/or based on an output of a model (e.g., a machine learning model) trained to identify content indicative of formatting for a form field based on an input of the content of the electronic document.

Figure 1C:
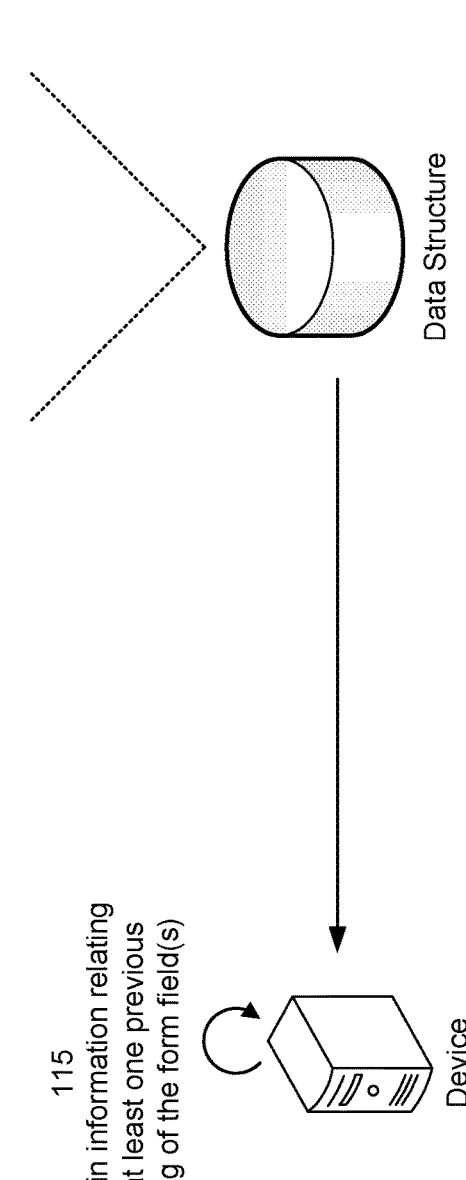

As shown in FIG. 1C, and by reference number 115, the device may obtain information relating to at least one previous filling of one or more of the form fields. A previous filling of a form field may be associated with a successful submission of the form (e.g., the previous filling of the form field did not return an error and the form submission was accepted) or an unsuccessful submission of the form. The information may indicate at least one previous formatting used for a previous filling of a form field. For example, the information may include a formatting rule (e.g., a regular expression) based on the formatting, a template of the formatting, or a representation of text used for a previous filling, among other examples. In some examples, the information may include non-personally-identifiable information. For example, rather than the information identifying the text used for a previous filling of a form field, the information may identify a representation of the text that does not include personally-identifiable information. As an example, as shown in FIG. 1C, a last name entered as "Smith, Jr." in a previous filling of a form field may be represented as "Aaaaa, Aa." in the information, and/or a phone number entered as "(999) 234-5678" in a previous filling of a form field may be represented as "(###) ###-####" in the information.

The device may obtain the information from a data structure (e.g., a database). The information in the data structure may be based on previous fillings of the form fields (e.g., the same form fields, of the same form and the same electronic document, that are to be filled) by the user and/or one or more different users. For example, if the user or a different user previously filled out the form fields and successfully submitted the form, information identifying the formatting used for the form fields may be stored to the data structure. As an example, if the user or the different user filled a phone number form field of the electronic document with a consecutive string of numbers, and successfully submitted the form, information identifying a consecutive string of numbers as a formatting for the phone number form field of the electronic document may be stored to the data structure. Accordingly, the data structure may identify an association between an electronic document (e.g., a web page address), a form of the electronic document (e.g., an identifier for the form indicated by the electronic document), a form field of the form (e.g., an identifier for the form field indicated by the electronic document), and a formatting used for a previous filling of the form field. The data structure may be stored locally at the device or stored at a remote device.

Figure 1D:
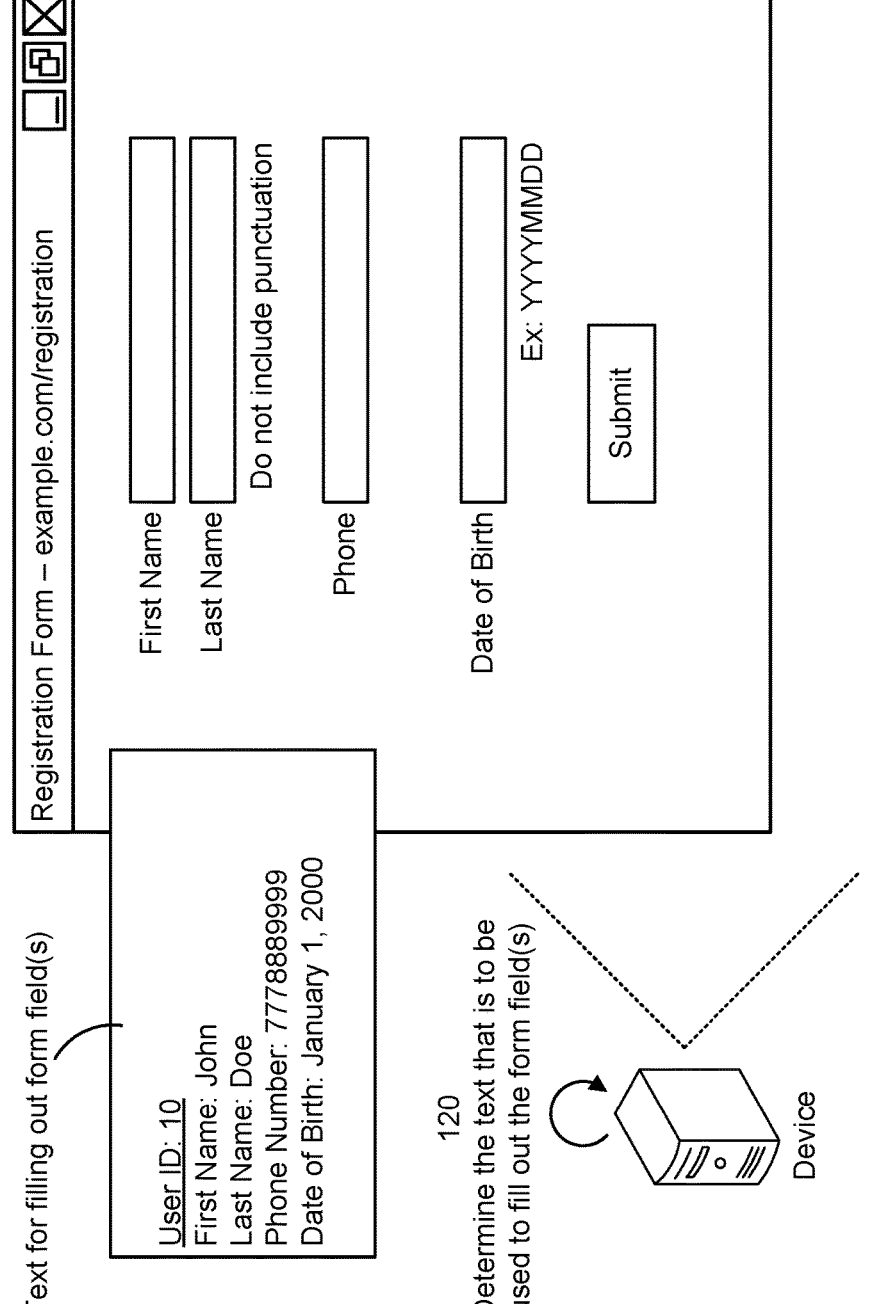

As shown in FIG. 1D, and by reference number 120, the device may determine the text that is to be used to fill out the form fields. In some implementations, the device may obtain user data associated with the user of the device. For example, the device may store user data for each user (e.g., each user profile) of the device, and the device may obtain the user data associated with the current user (e.g., associated with the user profile). The user data may include text used to fill out various form fields. For example, the user data may include text for entry to a first name form field, text for entry to a last name form field, text for entry to an email form field, etc.

The device may determine the text, from the user data, that is to be used to fill out a particular form field based on one or more attributes of the form field. For example, the device, when identifying the form fields as described above, may identify one or more attributes of each form field. The attributes of a form field may include a name of the form field, an identifier of the form field, a formatting style used for the form field, and/or a type of the form field, among other examples. Based on the attributes, the device may determine the type of text that is to be used for filling out the form field. For example, the name attribute and/or the identifier attribute of the form field may include the word "email," thereby indicating that the type of text that is to be used for filling out the form field is an email address. Accordingly, the device may determine the particular text, from the user data, that is to be used to fill out each form field based on the type of text that is determined to be used for filling out each form field.

Figure 1E:
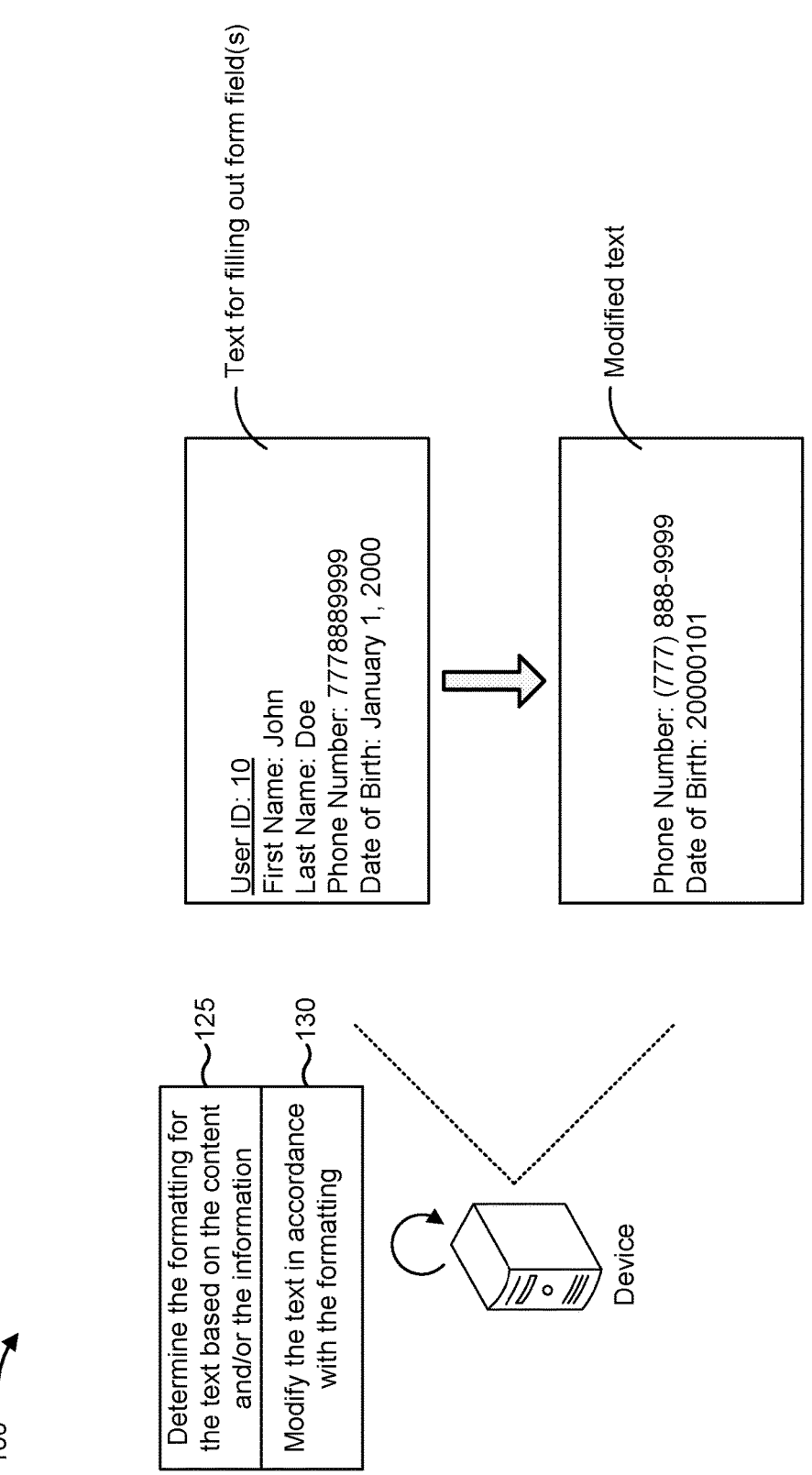

As shown in FIG. 1E, and by reference number 125, the device may determine the formatting for the text for a form field based on content that is indicative of the formatting and/or information relating to previous filling(s) of the form field. In some implementations, the device may determine the formatting based on processing the content using an artificial intelligence technique. For example, the device may determine the formatting based on natural language processing of the content. For example, if the content associated with the form field includes the text "do not use the & or $ characters," then the device may use natural language processing of the text to determine that the formatting for the form field includes a rule that the & and $ characters are not to be used.

In some implementations, to determine the formatting for the text, the device may determine a formatting rule (e.g., a regular expression) that is to be used for the formatting. The device may determine the formatting rule based on the content. For example, if the content associated with a form field for entry of a website address includes the text "Example: www.yourwebsite.com," then the device may determine a regular expression corresponding to the example provided by the text. Additionally, or alternatively, the device may determine a formatting rule (e.g., a regular expression) that is to be used for the formatting based on the information relating to previous filling(s) of the form field. For example, the information may indicate, for the form field, one or more first previous formattings used for a successful submission of the form and/or one or more second previous formattings used for an unsuccessful submission of the form, and the device may determine a regular expression for the formatting based on the first previous formatting(s) and/or the second previous formatting(s). Thus, the information may include a formatting rule (e.g., a regular expression) that is based on one or more (e.g., a plurality of) previous fillings of the form field that are associated with a successful submission of the form and/or an unsuccessful submission of the form.

In some implementations, the device may use a model (e.g., a machine learning model) to determine the formatting for the text. The model may be trained to output the formatting (e.g., a formatting rule, a formatting template, text representative of the formatting, or the like) used for the form field based on an input of the content that is indicative of the formatting for the form field and/or the information relating to previous filling(s) of the form field. In some examples, the content and/or the information, and the text to be formatted, may be input to the model, and the model may output formatted text.

The formatting that is determined may indicate whether the text for the form field is to include, or is not to include, one or more particular characters (e.g., the formatting may indicate that a form field for entry of a company name is not to include punctuation); whether the text for the form field is to include, or is not to include, one or more particular text strings (e.g., the formatting may indicate that a form field for entry of a website address is to include the text string "http://"); an order in which characters of the text are to be arranged (e.g., the formatting may indicate that entry of a date of birth into a form field is to be in the order of year, month, and day); a location for spacing in the text (e.g., the formatting may indicate that entry of a phone number into a form field is to include a space after an area code); and/or a location for characters in the text (e.g., the formatting may indicate that entry of a phone number into a form field is to include an area code between parentheses and is to include a hyphen before the last four digits of the phone number).

In some implementations, the device may determine the formatting for the text for the form field based on both of the content that is indicative of the formatting and the information relating to previous filling(s) of the form field. In one example, the device may determine the formatting for the text based on the content indicative of the formatting, as described above, and the device may assign a confidence score for the formatting that is determined (e.g., indicating a level of confidence that the formatting that is determined is correct). Continuing with the example, if the confidence score satisfies a threshold value, then the device may accept the formatting that is determined; however, if the confidence score does not satisfy the threshold value, then the device may determine the formatting for the text based on the information relating to previous filling(s) of the form field, as described above.

In some implementations, the device may determine the formatting for text to be used for filling a form field based on content that is indicative of the formatting, as described above, and the device may determine another formatting for different text to be used for filling a different form field based on information relating to at least one previous filling of the different form field, as described above. As described below, the device may modify the text for the form field in accordance with the formatting to obtain formatted text, and cause filling of the form field with the formatted text, and the device may modify the different text for the different form field in accordance with the other formatting to obtain different formatted text, and cause filling of the different form field with the different formatted text.

In some implementations, the device may determine the formatting using a model trained to output the formatting based on an input of at least the content indicative of the formatting and the information relating to previous filling(s) of the form field. In some examples, the content, the information, and the text to be formatted may be input to the model, and the model may output formatted text.

In some implementations, the device may use the formatting that is determined to determine the text that is to be used to fill the form field (e.g., in addition to, or alternatively to, the determination described above with respect to reference number 120). For example, if the formatting for the form field indicates that text entered to the form field is not to include punctuation, then the device may determine that the form field is not used for entry of an email address or a website address. As another example, if the formatting for the form field indicates that text entered to the form field is to include only letters, then the device may determine that the form field is used for entry of a first name or a last name.

As shown by reference number 130, the device may modify the text to be used for a form field in accordance with the formatting determined for the form field. The device may modify the text in accordance with the formatting to obtain formatted text for the form field. To modify the text, the device may process the text using a code-based formatting rule (e.g., a regular expression, search pattern, or the like), the device may conform the text to a formatting template, or the like. For example, if the text to be used for filling a date of birth form field includes "Jan. 1, 2020," and the formatting for the date of birth form field indicates that the text is not to include spaces and the text is to be arranged as a four digit year, a two digit month, and a two digit day, then the device may modify the text to "20200101."

Figure 1F:
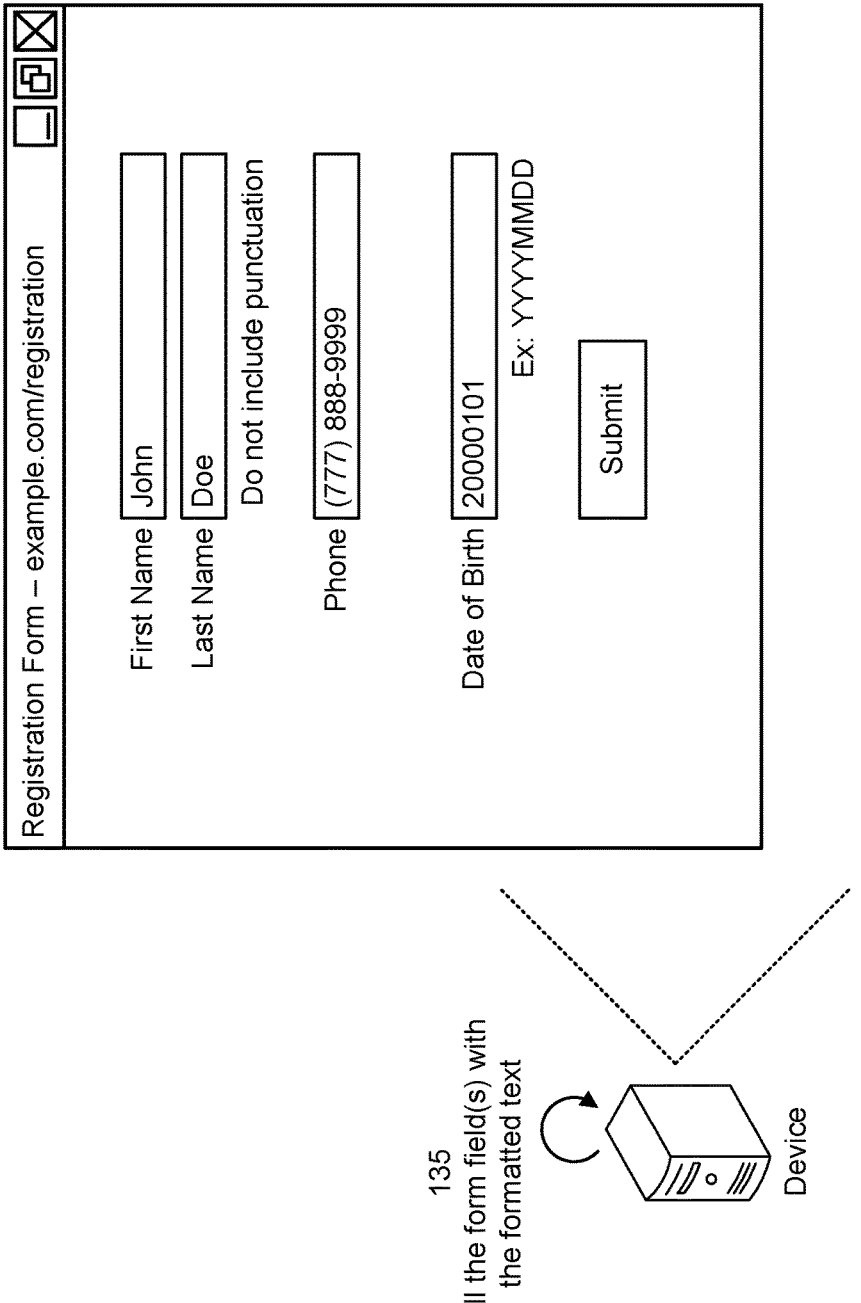

As shown in FIG. 1F, and by reference number 135, the device may fill one or more form fields of the form with formatted text. That is, the device may cause filling of a form field with formatted text. For example, the device may execute code that inserts formatted text into the appropriate form field (e.g., based on a name attribute and/or an identifier attribute of the form field). In this way, the device may automatically fill the form field(s) with formatted text. That is, the form field(s) are filled, using the appropriate formatting, without the user manually entering text into the form field(s) or manually modifying the formatting of the text.

In some implementations, the device may submit, via the electronic document, the form with formatted text in one or more of the form fields. That is, the device may transmit information, that includes the formatted text, to a remote device (e.g., a server device) for processing in connection with submission of the form. Accordingly, errors preventing successful form submission may be reduced, thereby conserving processing resources and/or network resources that may otherwise be used for multiple form submissions.

The device may receive, from the remote device, an indication of whether the formatted text is accepted in connection with submission of the form. As described above, because the text is formatted prior to submission of the form, there is an improved likelihood that the text will be accepted. Thus, the indication may indicate that the form submission is successful, that the form submission has been received, etc., to indicate that the formatted text was accepted. However, in some cases, the text may not be accepted. Here, the indication may indicate an error associated with the formatted text, an error associated with a form field, an error associated with submission of the form, etc., to indicate that the formatted text was not accepted. In some examples, the indication may not provide sufficient information to enable the device to determine which form field(s) are associated with the error. Here, the device may compare the text in the form fields for a first submission of the form that is unsuccessful, and the text in the form fields for a second submission of the form that is successful, to determine for which form fields the text was changed from the first submission of the form to the second submission of the form, thereby indicating the form fields associated with the error.

The device may generate a record for the form field (e.g., for storage in the data structure) indicating the formatting used for the text and whether the formatted text was accepted. In this way, the record may provide information relating to a previous filling of the form field, as described above, for a subsequent filling of the form field in connection with the user or a different user.

As indicated above, FIGS. 1A-1F are provided as an example. Other examples may differ from what is described with regard to FIGS. 1A-1F.

Figure 2:
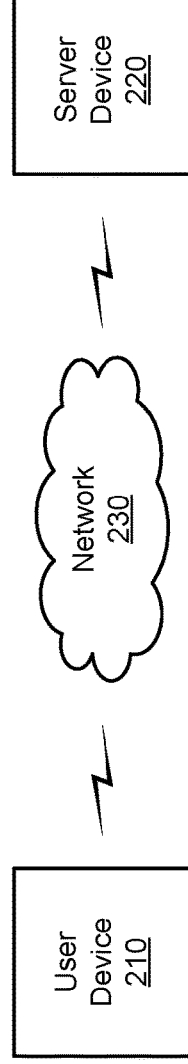
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, and a network 230. Devices of environment 200 may interconnect via wired connections, wireless connections, or a combination of wired and wireless connections.

The user device 210 includes one or more devices capable of receiving, generating, storing, processing, and/or providing information associated with automatic filling of a form with formatted text, as described elsewhere herein. For example, the user device 210 may identify a form field to be filled with text, determine a formatting for the text to be filled into the form field, modify the text in accordance with the formatting, and/or fill the form field with the formatted text. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 220 includes one or more devices capable of receiving, generating, storing, processing, providing, and/or routing information associated with an electronic document (e.g., a web page) presented at the user device 210, as described elsewhere herein. For example, the server device 220 may process a form submission and provide an indication of whether text entered into fields of the form is accepted. In some implementations, the server device 220 may implement a data structure that includes information relating to previous fillings of form fields. The server device 220 may include a communication device and/or a computing device. For example, the server device 220 may include a server, such as an application server, a client server, a web server, a database server, a host server, a proxy server, a virtual server (e.g., executing on computing hardware), or a server in a cloud computing system. In some implementations, the server device 220 includes computing hardware used in a cloud computing environment.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
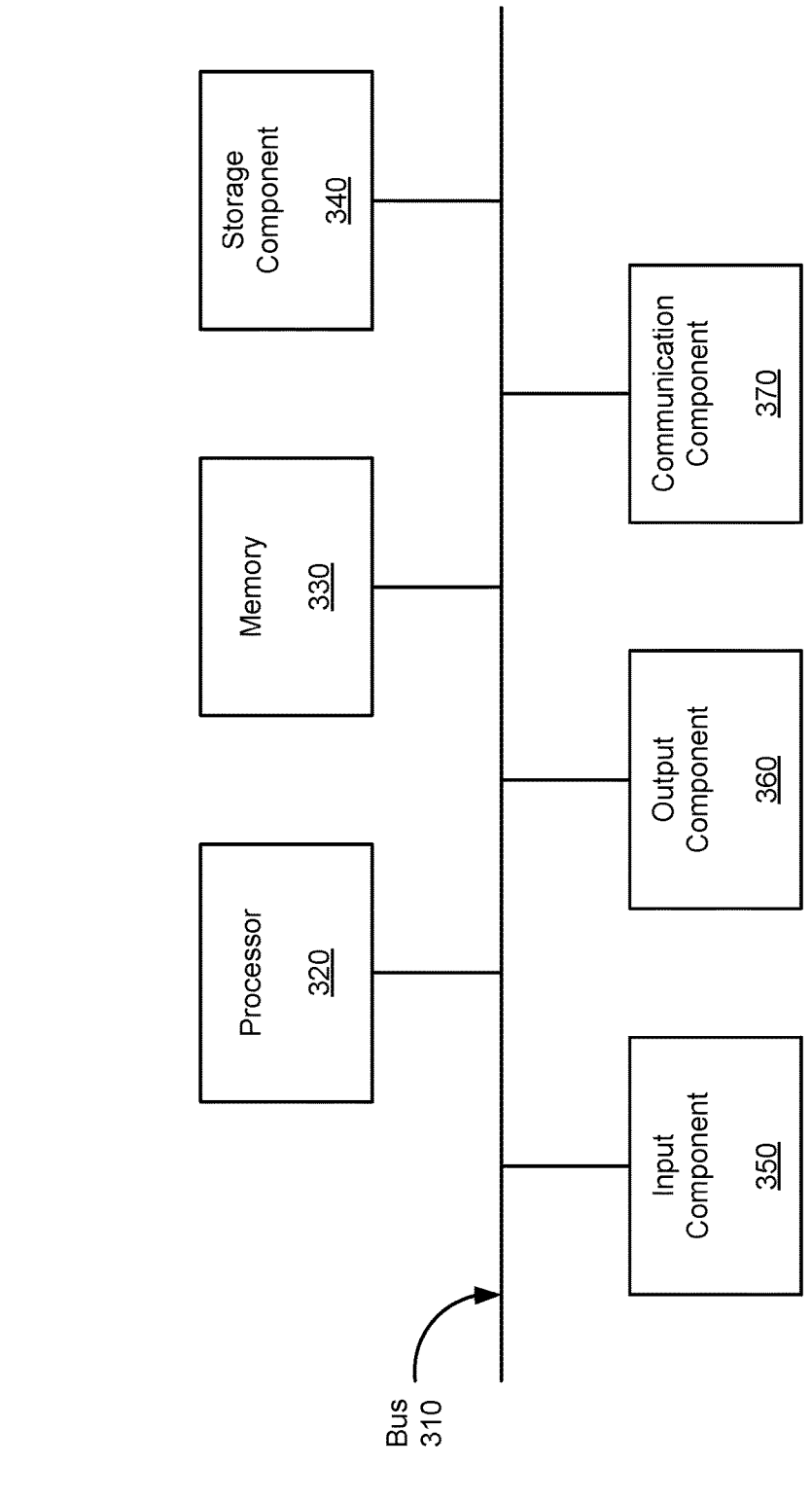
FIG. 3 is a diagram of example components of one or more devices of FIG. 2.

FIG. 3 is a diagram of example components of a device 300, which may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The quantity and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
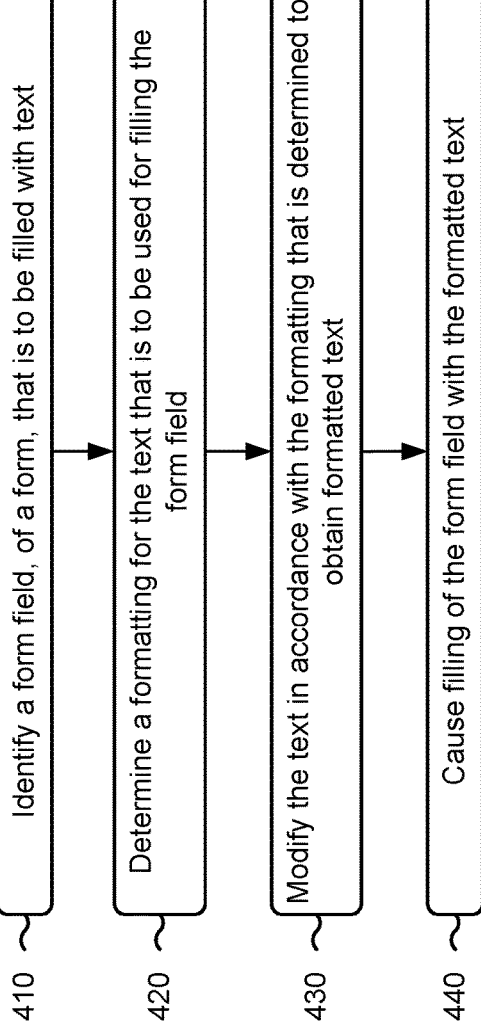
FIG. 4 is a flowchart of an example process relating to automatic filling of a form with formatted text.

FIG. 4 is a flowchart of an example process 400 associated with automatic filling of a form with formatted text. In some implementations, one or more process blocks of FIG. 4 may be performed by a device (e.g., user device 210). In some implementations, one or more process blocks of FIG. 4 may be performed by another device or a group of devices separate from or including the device, such as server device 220. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include identifying a form field, of a form, that is to be filled with text (block 410). As further shown in FIG. 4, process 400 may include determining a formatting for the text that is to be used for filling the form field (block 420). In some implementations, the formatting for the text is determined based on content that is indicative of the formatting that is to be used for filling the form field, and/or information relating to at least one previous filling of the form field that is associated with a successful submission of the form, where the information indicates at least one previous formatting used for the at least one previous filling of the form field. As further shown in FIG. 4, process 400 may include modifying the text in accordance with the formatting that is determined to obtain formatted text (block 430). As further shown in FIG. 4, process 400 may include causing filling of the form field with the formatted text (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
identifying, by a device, text to be inserted into a form field of an electronic document;
identifying, by the device, content indicative of a first formatting to be used for the text, wherein the content indicative of the first formatting is different from the text;
determining, by the device, a confidence score for formatting the text based on the content indicative of the first formatting;
determining, by the device and based on the confidence score failing a threshold and information relating to a previous filling of the form field, a second formatting for the text, wherein the second formatting is a same or different formatting as the first formatting;
modifying, by the device, the text in accordance with the second formatting; and
causing, by the device, the form field to be automatically filled with the modified text without a user manually entering text into the form field and without the user manually modifying the formatting of the text,
wherein the form field is caused to be automatically filled with the modified text by executing code that inserts the modified text in the form field.

2. The method of claim 1,
wherein the content indicative of the first formatting is located on the electronic document.

3. The method of claim 1, wherein, when the confidence score satisfies the threshold, the second formatting is the same formatting from the first formatting.

4. The method of claim 1, wherein, when the confidence score fails to satisfy the threshold, the second formatting is the different formatting from the first formatting and is further determined based on the previous filling of the form field.

5. The method of claim 4, further comprising:
obtaining information indicating the previous filling of the form field.

6. The method of claim 5,
wherein the information indicating the previous filling of the form field includes at least one of: a formatting rule, a template of the formatting, or a representation of text used for the previous filling of the form field.

7. The method of claim 1,
wherein the second formatting for the text is determined using a machine learning model trained to output the second formatting for the text based on a formatting rule and the information relating to the previous filling of the form field.

8. The method of claim 1,
wherein the text is identified based on one or more attributes of the form field.

9. The method of claim 1,
wherein causing the form field to be automatically filled with the modified text comprises:
transmitting information, that includes the modified text, to a remote device for processing in connection with submission of the electronic document; and
receiving, from the remote device, an indication of whether the modified text is accepted.

10. A system, comprising:
one or more memories; and
one or more processors, coupled to the one or more memories, configured to:
determine a formatting, of a text that is to be inserted in a form field of an electronic document, based on:
a confidence for the formatting failing a threshold,
content indicative of the formatting, and
information indicating a previous filling of the form field;
modify the text in accordance with the formatting; and
cause the form field to be automatically filled with the modified text without a user manually entering text into the form field and without the user manually modifying the formatting of the text,
wherein the form field is caused to be automatically filled with the modified text by executing code that inserts the modified text in the form field.

11. The system of claim 10,
wherein the one or more processors are further configured to:
identify the content indicative of the formatting,
wherein the formatting is determined based on the confidence for the formatting and the content indicative of the formatting, and
wherein the content indicative of the formatting is located on the electronic document.

12. The system of claim 10,
wherein the one or more processors are further configured to:
obtain the information indicating the previous filling of the form field,
wherein the formatting is determined based on the confidence for the formatting and the information indicating the previous filling of the form field.

13. The system of claim 10,
wherein the information indicating the previous filling of the form field includes at least one of: a formatting rule, a template of the formatting, or a representation of text used for the previous filling of the form field.

US 12,561,517 B2

13

14

14. The system of claim 10,
wherein the one or more processors are further configured
to:
   determine, based on one or more attributes of the form
   field, the text that is to be inserted into the form field.
15. The system of claim 10,
wherein the one or more processors are further configured
to:
   determine a formatting rule that is to be used for the
   formatting of the text based on at least one of:
      content of the electronic document, or
      information relating to the previous filling of the
      form field.
16. The system of claim 10,
wherein the text is modified using a code-based format-
ting rule.
17. The system of claim 10,
wherein the one or more processors, to cause the form
field to be automatically filled with the modified text,
are configured to:
   transmit information, that includes the modified text, to
   a remote device for processing in connection with
   submission of the electronic document; and
   receive, from the remote device, an indication of
   whether the modified text is accepted.
18. A non-transitory computer-readable medium storing a
set of instructions, the set of instructions comprising:
   one or more instructions that, when executed by one or
   more processors of a device, cause the device to:
      determine a formatting, of a text that is to be inserted
      in a form field of an electronic document, based on:
      a confidence for the formatting failing a threshold,
      content indicative of the formatting, and
      information indicating a previous filling of the form
      field;

modify the text in accordance with the formatting; and
cause the form field to be automatically filled with the
   modified text without a user manually entering text
   into the form field and without the user manually
   modifying the formatting of the text,
   wherein the form field is caused to be automatically
   filled with the modified text by executing code that
   inserts the modified text in the form field.
19. The non-transitory computer-readable medium of
claim 18,
wherein the one or more instructions further cause the
device to:
   identify the content indicative of the formatting,
      wherein the formatting is determined based on the
      confidence for the formatting and the content
      indicative of the formatting, and
      wherein the content indicative of the formatting is
      located on the electronic document.
20. The non-transitory computer-readable medium of
claim 18,
wherein the one or more instructions further cause the
device to:
   obtain the information indicating the previous filling of
   the form field,
      wherein the formatting is determined based on the
      confidence for the formatting and the information
      indicating the previous filling of the form field.
21. The non-transitory computer-readable medium of
claim 18,
wherein the information indicating the previous filling of
   the form field includes at least one of: a formatting rule,
   a template of the formatting, or a representation of text
   used for the previous filling of the form field.

* * * * *